H. S. ANDERSON.
PROCESS OF PREPARING CRUSHED STONE.
APPLICATION FILED APR. 3, 1911.
1,013,100.
Patented Jan. 2, 1912.
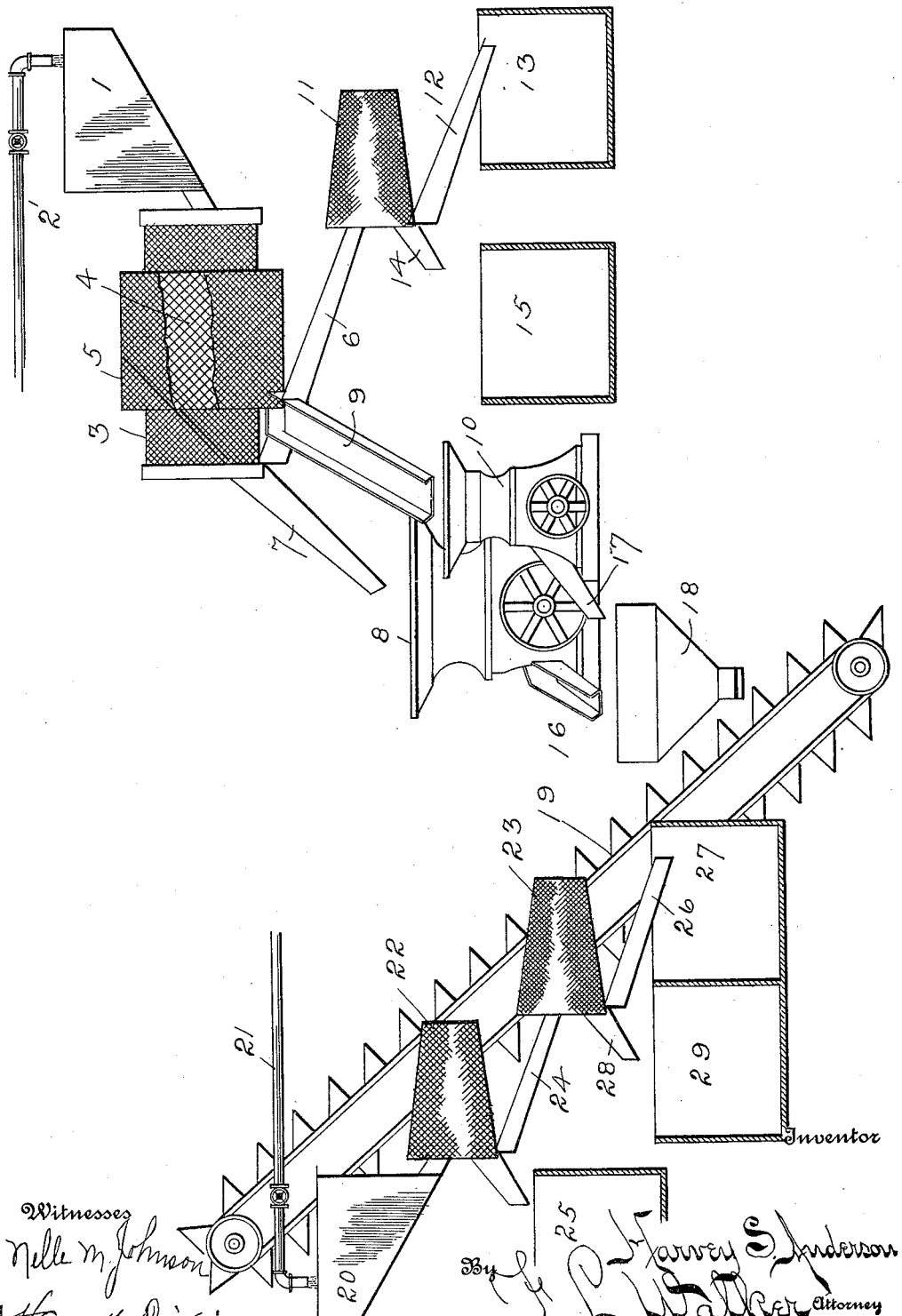

UNITED STATES PATENT OFFICE.

HARVEY S. ANDERSON, OF DAYTON, OHIO.

PROCESS OF PREPARING CRUSHED STONE.

1,013,100.  Specification of Letters Patent.  Patented Jan. 2, 1912.

Application filed April 3, 1911. Serial No. 618,688.

*To all whom it may concern:*

Be it known that I, HARVEY S. ANDERSON, a citizen of the United States, residing at Dayton, in the county of Montgomery and State of Ohio, have invented certain new and useful Improvements in Processes of Preparing Crushed Stone, of which the following is a specification.

My invention relates to an improved method of preparing gravel stone or similar materials for use in concrete, grouting or for other purposes and particularly relates to an improved method for cleansing the material.

The object of the invention is to provide a simple economical and efficient process, easily and quickly performed whereby the resulting product will be clean and free from dust, foreign matter or adhering particles, and whereby certain portions of the refuse material will be separated into usable by-products.

With the above primary and other incidental objects in view as will more fully appear in the specification, the invention consists of the several operations, and the combination thereof, and the mode of procedure or their equivalents, as hereinafter described and set forth in the claims.

The drawing herewith is an elevation somewhat diagrammatic in form, showing a gravel or stone washing and crushing plant and illustrating the method or process forming the subject matter hereof.

In making concrete mixtures, grouting, etc., it is desirable to use gravel or broken stone the individual pieces of which have substantially equal size, free from dirt, dust or adhering particles whereby the binding material or cement may unite directly with the stone. When the gravel or stone carries a coating of dirt, dust or other adhering material, the cement or binding material is prevented from reaching the stone or gravel by such adhering particles which form an insulating covering about the stone or gravel, thereby making the union of the cement or binding material therewith very imperfect.

In crushing stone or gravel a very considerable portion of the material is reduced to the form of grit or dust which by the usual method is lost. This grit or dust is a usable by-product and one object of the present invention is to provide means whereby this by-product may be saved in a profitable form, while at the same time the larger pieces of gravel or broken stone are thoroughly cleansed from such grit or dust.

Referring to the drawing 1 is a receiving hopper in which is placed the raw material comprising gravel, stone, clay, loam, silt, etc., all intermixed with other foreign material. A water supply pipe 2 discharges into the receiving hopper 1, whereby a constant flow of water is provided upon the raw material reducing the soluble portions thereof to a fluid state and separating the adhering particles from the stone or gravel. This washing usually removes most of the mud or clay adhering to the stone. From the receiving hopper 1 the material passes to the screen or separator 3. This screen or separator comprises a perforated cylindrical body the medial portion of which is provided with perforations of greater size as shown at 4. This section containing the larger perforations is inclosed in a jacket 5 having perforations corresponding with those of the remainder of the cylindrical body 3. As the material is passed through the screen or separator 3 the sand or small particles are washed through the small perforations of cylinder 3 by the water flowing from the receiver hopper 1 and fall onto a pan or chute 6 located beneath the screen or separator 3. The medium sized stone or gravel passes through the larger perforations 4 of the screen or separator into the jacket surrounding the cylindrical body 3 and the sand or small particles carried by such stones through the perforations 4 are discharged through the smaller perforations of the jacket 5 into the same pan or chute 6 before mentioned. This separator or screen sorts the material into three different sizes, first the sand and mud which pass through the exterior of the cylinder 3 and jacket 5 into the pan 6, second the medium size gravel or stone which passes through the perforations 4 into the jacket 5 and third the larger stones which being too large to pass through the perforations 4 are carried through the cylinder 3. These larger stones are discharged from the cylinder 3 through a chute 7 into a crusher 8 which may be of any desired construction, and so adjusted as to operate on stones of large size. The second grade stones or those of medium size which pass through the perforations 4 into the jacket 5 are discharged through a chute 9 into a crusher 10 which is adjusted to operate upon medium size stones. The small gravel and sand which fall through the exterior of the cylinder 3 in the jacket 5 into the pan 6 are conducted to the rotary screen or separator 11 which is of finer mesh than the separator 3. The sand and small particles pass through the perforations of the cylinder or separator 11 into the pan or chute 12 by which they are conducted to the sand bin 13, while the small gravel too large to pass through the perforations of the screen or separator 11 is discharged through the chute 14 into the gravel bin 15.

The crushers 8 and 10 are adjusted to crush the stone into substantially the same size, but are adapted to operate upon stones of different sizes. The crushed stone is discharged from the crushers 8 and 10 through the chutes 16 and 17 into a common hopper or receiver 18, thus the stones which were separated by the cylinder 3 after being crushed are again mixed together in a common hopper 18.

It is found in practice that while the stones are washed comparatively clean when they leave the receiving hopper 1 and the screen 3 they carry with them a film of dirty water which as the stones dry forms a deposit of sediment upon the under surface of each stone. While the amount of sediment deposited upon each stone is very small the quantity carried by a large number of tons of the washed stone will be a considerable amount. The crushing operation loosens a great proportion of such adhering particles and furthermore reduces a portion of the stone to dust or to various small particles in the form of grit. Such loosened particles of mud or sand and the dust and grit formed by the crushing operation are carried with the crushed material into the hopper 18, such dust, grit and sand if allowed to remain in the crushed material interferes seriously with the knitting or uniting of the cement with the crushed stone. Furthermore such dust and grit if separated from the crushed stone is a usable product for certain classes of work. The hopper 18 discharges into a conveyer or elevator 19 which in turn carries the material to a second hopper or receiver 20. The hopper or receiver 20 is provided with a water supply 21 entirely independent of the supply 2 of the primary hopper 1. The crushed material discharged into the second hopper 20 is treated to a cleansing bath of fresh clean water from the supply pipe 21, which not only separates the dust from the stones but prevents the lighter portions of the dust from being carried through the air and eventually lost. The crushed material comprising stone of proper size intermixed with dust and grit resulting from the crushing process is washed through the hopper 20 into a series of rotary screens or separators 22 and 23.

The mesh of the screen or separator 23 is finer than that of the screen 22. As the screen 22 is rotated the smaller portions of the material comprising the grit dust and fine rock particles are sifted through the perforations of the screen 22 into the pan or chute 24 by which they are conveyed to the second rotary screen 23. The larger portions of crushed rock which are the portions most desired for concrete work are discharged from the screen 22 into the receiving bin 25, in a thoroughly cleansed condition free from all dust, adhering particles and small rock particles ground off during the crushing process. The refuse material passing from the screen 22 through the chute or pan 24 to the screen 23 is again separated the dust passing through the finer perforations of the screen 23 into the pan or chute 26 from which it is discharged into the dust bin 27, while the grit comprising the larger particles is discharged from the screen 23 through the chute 28 into the grit bin 29. It will be seen that in addition to the crushed stone which is the main object of the process and which is finally discharged into the receiving bin 25, there are produced four by-products the stone grit comprising small sharp particles, ground from the stone during the crushing process which are finally discharged into the bin 29, the stone dust 27 also produced by crushing operation and further the gravel received into the bin 15 in its natural state and the sand received in the bin 13. The sand in the bin 13 is intermixed with mud, loam or other foreign material. If it is desired to save the sand a second screen may be arranged in series with the screen 11 into which the sand and loam, clay and other foreign material is discharged, which will separate sand discharging it into one bin while the loam, clay and other soluble products pass through the smaller perforations of such screen into a refuse bin. Such additional screen for separating the sand from the loam or clay has not been shown in the drawing. If the natural sand is thus separated from the mud, slime and foreign material, this sand together with the stone dust resulting from the crushing process discharged from the chute or pan 26, may be received together in a common bin. Such combination of clean, fine sand and the stone dust becomes a valuable product for the making of mortar, more particularly mortar for laying brick.

While the preliminary washing removes the mud, clay, loam and other foreign material prior to the crushing operation, the final washing subsequent to the crushing operation is designed to remove material which cannot be removed by the first washing and particularly to remove such matter as is loosened by the crushing operation. It is frequently found that the larger washed stone carries with it a scale or film or stony matter which while insoluble and incapable of being removed by the washing process, is less hard than the body of the stone and is very undesirable for building purposes on account of its lack of tensile strength. The stones are also found to contain in crevices and pockets insoluble stony material which adheres to the stone and is impossible to remove by the washing process, but which like the scale or scab before mentioned renders the material undesirable for building purposes.

During the crushing operation both the scale or scab carried on the surface of the stone, and the stony material before mentioned contained in crevices or pockets of the stone is loosened and broken up and being of less hardness than the body of the stone such stony matter is pulverized or reduced to comparatively small parts. Without the final washing process this stony material which is like hard clay or stone in the process of formation together with the stone dust or grit broken or ground off the stone during the crushing operation would be contained in the finished product. This stony matter which is of less density than that of the stone, and therefore proportionately lighter in weight, after being detached from the stone, by the crushing process is readily removed by the final washing operation. Thus the final washing operation, subsequent to the crushing of the material is quite essential and produces a very high grade of washed material.

It is further desirable that the water supply for the re-washing or final washing operation shall be clean water which will dissolve and remove any sediment remaining on the crushed material resulting from the evaporation of the dirty wash water left thereon by the first washing operation.

While the separator 3 is shown in the drawing as a revoluble cylindrical screen and the screen members 11, 22 and 23 are shown in the drawing as revoluble conical or tapered screens it is to be understood that the particular form or shape of the screen or its mode of operation is not material to the herein described process but that any form of separator or screening apparatus may be employed.

The flow of water acting on the crushed material on account of the small size and light weight of the individual pieces after crushing, assists in moving the material causing it to flow more rapidly through the second series of screens, and enabling much greater quantities of material to be handled in a given time than if the material was operated upon in a dry state.

Having thus described my invention I claim:

1. A process of treating stone comprising, washing the mass to remove the soluble material, loam and vegetable matter, separating the natural sand from the washed material, separating from the remaining material the gravel and small pebbles, crushing the large pebbles and stones, rewashing the crushed material to remove the dried deposit left by the first wash water, and the scab and scale and stony adhering material loosened in the crushing operation, and finally separating from the crushed material the sharp grit resulting from the crushing operation in the form of a usable product free from natural sand, substantially as specified.

2. A process of treating stones, comprising washing the mass of crude material, sorting the washed material according to size and removing the natural fine material, separately crushing the lots of different sized stones, to pieces of substantially equal size, rewashing the crushed material subsequent to the crushing operation, separating from the rewashed crushed material the grit resulting from the crushing operation in the form of a usable product free from natural sand or other material.

In testimony whereof, I have hereunto set my hand this 21st day of March A. D. 1911.

HARVEY S. ANDERSON.

Witnesses:
H. P. WILLIAMSON,
NELLE M. JOHNSON.